H. MINER, H. M. STEVENS & W. H. SAUNDERS.
COUPLING FOR VEHICLES.
No. 14,985. Patented May 27, 1856.
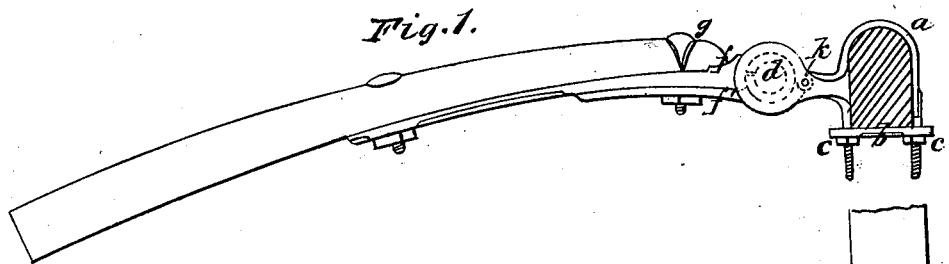
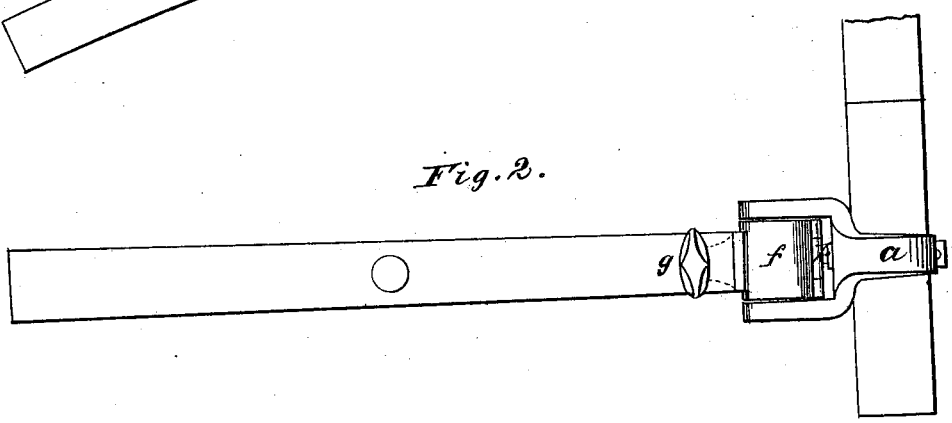
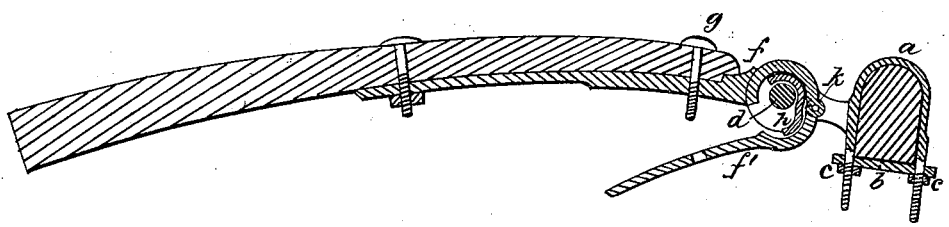
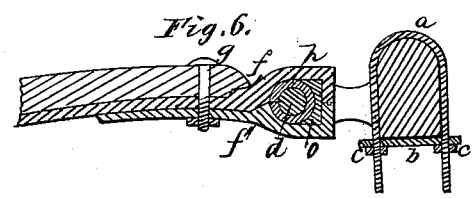
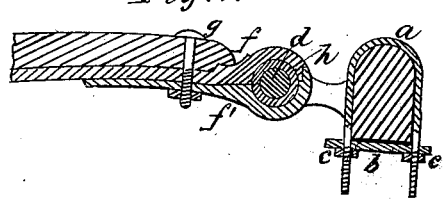
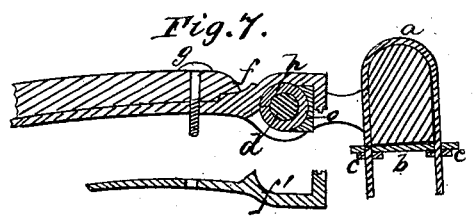
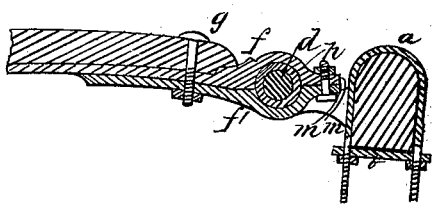

UNITED STATES PATENT OFFICE.

H. MINER AND H. M. STEVENS, OF NEW YORK, AND WM. H. SAUNDERS, OF HASTINGS-ON-THE-HUDSON, NEW YORK.

COUPLING FOR VEHICLES.

Specification of Letters Patent No. 14,985, dated May 27, 1856.

*To all whom it may concern:*

Be it known that we, HARVEY MINER and HENRY M. STEVENS, carriage-builders, of the city, county, and State of New York, and WM. H. SAUNDERS, of Hastings-on-the-Hudson, Westchester county, New York, have jointly invented certain new and useful Improvements in the Manner of Coupling Shafts and Poles to the Axletrees of Vehicles, and that the following specification, taken in connection with the drawings, is a full and exact description thereof.

In the drawings: Figure 1 is a side elevation of our coupling complete shown as applied to a shaft. Fig. 2 is a bird's eye view thereof. Fig. 3 is a vertical section through the same. Fig. 4 is a section through a modified form of our invention. Fig. 5 is a section through another modification and Figs. 6 and 7 are sections through a third modification the same letters refer to the same parts in all the drawings.

The jingling or rattling noise made by the ordinary shaft or pole coupling after a vehicle has been a short time in wear, is a constant source of annoyance to those riding in it, and what is a mere inconvenience in the first place finally becomes a positive evil as the bolt through the eye and through the apertures in the sides of the clip becomes smaller until it breaks thus detaching the horse from the vehicle.

The object of our invention is to remedy both the annoyances and the evils above referred to, thereby making the vehicle to which our invention may be applied more comfortable more durable and safer; and to this end the nature of the first part of our invention consists in a divided eye attached to the shaft or pole, the two halves of which are connected to each other by a hinge and bolt, substantially as hereinafter set forth, so that it may closely squeeze a packing around a pin and be easily applied and removed therefrom.

The nature of the several part of our invention consists in combining with a divided eye a cylinder or ring of vulcanized rubber or some similar substance applied substantially as hereinafter specified whether the pin of bolt passing through the clips be fast or movable substantially as herein set forth.

In the drawings is represented at *a* an ordinary axle coupling clip with its lower ends drawn out and screwed so that it may be secured to the axle tree by a washer *b* and small nuts *c c*. In two projections or ears forming part of this clip are punched or drilled holes in which is secured a pin *d* made to fit the holes with nicety and having its ends riveted up, in countersinks in the clip or this pin may be fastened in any other way so long as it cannot by wear become loose.

Upon the shaft or tongue is secured an eye formed in two halves *f f* in such manner that the two halves may be opened, or parted the one from the other, or closed and held in contact by a screw bolt *g* or some equivalent therefor. The hole in this eye is considerably larger in diameter than the outside of the pin *d* and between the pin and eye is firmly clasped a piece of sheet india rubber or gutta percha or leather or some compressible and slightly elastic material colored red on the drawings to distinguish it clearly and lettered *h*.

In Figs. 1, 2 and 3 a small hinge *k* unites the hinder ends of the two parts of the eye while in Fig. 4 the ends merely lap over one another the securing together of the two parts of the eye depending entirely on the screw bolt.

In Fig. 5 the eye is represented without either lap or hinge its hinder extremities being fastened together by a small screw bolt passing through little ears *m m*.

In Figs. 6 and 7 the hole in the eye in place of being cylindrical is of irregular shape as shown in the drawings and a small metal journal *o* is inserted behind the pin and between it and the two hooked ends of the eye in this way the two halves of the eye are not so liable to part when they depend for their attachment upon a forward fastening only.

Other modifications might be enumerated but they would like the others all possess the same characteristics namely a divided eye whose halves are capable of being separated from or firmly attached to each other and so long as they have such features are all equivalent the one of the other. We prefer the hinge as there is then no danger of losing the lower half of the eye.

In putting our contrivance together it is best to use a piece of rubber as long as the space between the two ears of the clip and so thick that when wrapped around it the rubber shall slightly keep apart the two halves of the eye. The two halves are then clamped together, squeezing up the rubber and making an elastic joint between the eye and the clip. The squeezing up of the rubber will also make sufficient friction to prevent the eye from sliding along the pin so that the sides of the eye cannot strike or rattle against the inner side of the ears of the clip. As the bolt is fast in the clip it can neither shake rattle or wear and the eye cannot wear the bolt so long as any of the india rubber or leather remains. We think therefore that it is clear there can be no rattling or play and consequently no noise wear or breakage arising from wear of the metal work when our contrivance is employed.

We intend at times to make the aperture between the two halves of the eye of eliptical or irregular shape and to use a piece of rubber which shall not entirely surround the pin, preferring in such case to apply the partial cylinder or block of rubber behind the pin where the block o is located as shown in Figs. 6 and 7, where it is evident that it may be clamped fast and squeezed up against the pin as a ring might be by a divided eye.

When the rubber becomes worn it can easily be replaced by a new piece but we do not apprehend that this will occur often if it does at all during the life of a wagon, for the reason that we intend originally to use a ring of rubber larger or rather thicker than is absolutely necessary, and such a ring may from time to time be clamped up tighter by causing the two halves of the eye to approach each other more closely.

There is still another modification of our invention which may sometimes be useful and it consists in dividing the ears of the clip so that each can be opened and shut and in clasping such clip ears around a piece of rubber or other suitable packing surrounding the two ends of a bolt or pin firmly fastened at right angles to the end of the shaft. Two rings of rubber could thus be applied between each hole in each clip and the periphery of the cylindrical bolt secured upon the shaft or tongue.

Having thus described our contrivance we claim as new and of our joint invention—

A hinge and bolt or the equivalents thereof and a ring of vulcanized rubber or some other yielding and more or less elastic material applied substantially as herein specified in combination with a divided eye and a bolt or pin fixed in the clips either immovably or in such manner that it can be taken out and replaced the whole being applied to a vehicle and acting substantially in the manner and for the purposes herein set forth.

In testimony whereof we have hereunto set our hands and fixed our seals in the city of New York on this fifth day of November A. D. 1855.

HARVEY MINER. [L. S.]
    HENRY M. STEVENS. [L. S.]
    W. H. SAUNDERS. [L. S.]

In presence of—
    JOHN H. WHITMORE,
    LEWIS TIBBALS.